United States Patent [19]

Friedrich et al.

[11] Patent Number: 4,493,854
[45] Date of Patent: Jan. 15, 1985

[54] PRODUCTION OF DEFATTED SOYBEAN PRODUCTS BY SUPERCRITICAL FLUID EXTRACTION

[75] Inventors: John P. Friedrich, Green Valley; Arthur C. Eldridge, Morton, both of Ill.

[73] Assignee: The United States of America as represented by the Secretary of Agriculture, Washington, D.C.

[21] Appl. No.: 534,015

[22] Filed: Sep. 20, 1983

[51] Int. Cl.$^3$ ............... A23L 1/20; C11B 1/10
[52] U.S. Cl. ................. 426/629; 426/417; 426/425
[58] Field of Search ........... 426/425, 424, 629, 656, 426/489, 417

[56] References Cited

U.S. PATENT DOCUMENTS

| | | | |
|---|---|---|---|
| 3,939,281 | 2/1976 | Schwengers | 426/11 |
| 4,123,559 | 10/1978 | Vitzthum et al. | 426/312 |
| 4,255,346 | 3/1981 | Kock | 260/412.4 |

FOREIGN PATENT DOCUMENTS 2748885  5/1979  Fed. Rep. of Germany ...... 426/425

OTHER PUBLICATIONS

J. P. Friedrich et al., "Petroleum-Free Extraction of Oil from Soybeans with Supercritical $CO_2$," JAOCS 59(7): 288-292, (Jul. 1982).

Von Egon Stahl, "Komprimierte Gase zur Gewinnung von Naturstoffen," Fette. Seifen. Anstrichmittel 84(11): 444-451, (1982).

K. Warner et al., "Relationships of Sensory Characteristics and Gas Chromatographic Profiles of Soybean Protein Products," Cereal Chem. 60(2): 102-106, (1983).

*Primary Examiner*—George Yeung
*Attorney, Agent, or Firm*—M. Howard Silverstein; David G. McConnell; Curtis P. Ribando

[57] ABSTRACT

The raw grassy and bitter principles in soybeans are reduced to acceptable levels for purposes of human consumption without significant degradation of the nutritional properties. This result is achieved by a lipid extraction process in which raw soybean material is treated with carbon dioxide under carefully controlled supercritical conditions. Of particular importance are the moisture content of the bean material as well as the pressure, temperature, and contact time of the carbon dioxide extractant.

12 Claims, No Drawings

PRODUCTION OF DEFATTED SOYBEAN PRODUCTS BY SUPERCRITICAL FLUID EXTRACTION

BACKGROUND OF THE INVENTION

1. Field of the Invention

Over 1 billion bushesl of soybeans are processed domestically each year for recovery of soybean oil. Considerable effort has been made to expand world markets for the 24 million tons of defatted soybean meal and soybean flake byproducts produced by the oil extraction industry. Traditonally, the materials have been utilized as ingredients in animal feeds or further processed to produce food-grade protein concentrates or isolates designed for use in protein-supplemented blends for human consumption. One of the principal problems in developing soybean fractions as finished vegetable protein products for human use relates to their inherent flavor. Conventional solvent extraction methods using hexane or similar hydrocarbons leave constituents in the meal which are responsible for raw grassy and bitter flavors. Moreover, residual lipids in the meal tend to auto or enzymtically oxidize into compounds which contribute to development of off-flavors. The result is an eventual reduction in the product's organoleptic and nutritional qualities. Lipoxygenase is the enzyme implicated in part of the oxidative deterioration. Lipoxygenase can be inactivated by heat, but this process has proven unsatisfactory because heat (toasting) reduces the protein solubility as measured by nitrogen solubility index (NSI) from an initial value for the raw bean of 85-90 to unacceptable levels below 60. Alternative solvents such as ethanol and isopropanol have been investigated, but are not competitive with hexane from the standpoint of either solvent properties or recovery. This invention relates to a method of processing soybeans so as to extract the oil and simultaneously produce high-quality, food-grade protein fractions.

2. Description of the Prior Art

In the art of vegetable oil extraction, increasing attention has been given to the technology of supercritical fluids as an alternative to current extraction methods. Supercritical fluids (SCF's) are often referred to as dense gases. Technically, an SCF is a gas existing above its critical temperature and critical pressure, as defined in the phase diagram of the pure substance. When a gas is compressed above its critical temperature, densities increase dramatically. Therefore, under a given set of conditions, an SCF may possess the density of a liquid while maintaining the diffusivity of a gas. Of the several SCF's investigated, supercritical carbon dioxide (SC-$CO_2$) is ideal because it is nontoxic, nonflammable, nonexplosive, inexpensive, readily available, and easily removed from the extracted products. The solvent properties of SCF's have been recognized for over 100 years, but commercial applications have been slow in developing. Decaffeination of coffee and the extraction of hops with SC-$CO_2$ are the only current large-scale commercial SCF processes, though other uses are being investigated. British Patent No. 1,356,749 teaches the SCF extraction of oils from crushed or coarsely ground seeds including copra, sunflower, coconut, soybeans, and peanuts. Stahl et al. (J. Agric. Food Chem., 28(6): 1153-1157 (1980) elaborates on the parameters influencing the removal and fractionation of soybean, sunflower seed, and rapeseed oils in terms of yield, color, taste, and odor.

Friedrich et al. (JAOCS 59 (7): 288-292 (July 1982) compares the flavor of hexane-extracted soybean oil to that extracted by SC—$CO_2$ at pressures of 8000 p.s.i.g. (552 bar) and 50° C. As exemplified by these and other teachings in the art, applications of SCF technology have emphasized the oil recovery, with little or no attention being given to either the flavor or the nutritional value of the seed residue.

SUMMARY OF THE INVENTION

We have now unexpectedly discovered that when soybeans are subjected to lipid extraction by a carbon dioxide solvent under carefully controlled supercritical conditions, raw grassy and bitter off-flavors typical of the defatted meal are substantially reduced without undesirable reduction in the protein solubility as measured by NSI. As a result, the meal as well as concentrates and isolates prepared from the meal are characterized by an acceptable flavor.

In accordance with this discovery, it is an object of the invention to provide a process of producing high-quality, nutritious soybean protein products having high NSI values and organoleptic acceptability for purposes of human consumption.

More particularly, it is an object of the invention that the aforementioned process be compatible with a concurrent method for extracting and recovering oil from soybeans.

It is also an object of the invention that the extractant be economically feasible and environmentally safe.

It is a further object of the invention to produce soybean meal, flour, concentrates, and isolates which have acceptable flavor profiles and storage stability.

Other objects and advantages of the invention will become readily apparent from the ensuing description.

DETAILED DESCRIPTION OF THE INVENTION

The soybeans to be extracted in accordance with the invention must first be converted to a physical state that is permeable to the carbon dioxide under supercritical conditions. Typically, the whole bean is prepared by cracking, dehulling, and flaking. It is important that the initial moisture content of the prepared material be at least about 6.5% by weight. For all practical purposes, the moisture content will be held in the range of about 6.5-15% with 9-12% being preferred.

Any conventional SCF equipment comprising an extractor and separator would be suitable for carrying out the inventive method. In a typical batch operation, the soybean material is packed into the extractor, the extractor is sealed, and then the SC—$CO_2$ is injected at the predetermined combination of conditions as discussed below.

Temperature, pressure, moisture content, flow rate, and time of treatment are all integrally related and must be selected to drive the preponderance of oil from the bean material with minimal reduction in protein solubility, while at the same time achieving an acceptable flavor. Generally speaking, any combination of operating parameters which will produce a defatted product characterized by a high soluble nitrogen content and a substantial reduction in the grassy and bitter flavor intensities as compared to the raw bean is considered to be within the scope of the invention. In the defatted product, residual oil levels of 1% or less and NSI values greater than or equal to 60 are considered acceptable. As described further in Example 1, below, overall flavor quality is typically reported on a scale of 1 to 10 with 10 as bland(excellent quality) and 1 as strong (poor quality). Overall flavor scores should be equal to or greater than 6.0. Individual flavor intensity values (FIV's) are rated on a 0-3 scale, with 0 being equal to no flavor and 3equal to a strong flavor intensity. Raw grassy and bitter FIV's of 1.5 or less are in the acceptable range.

The time of treatment is an inverse function of SC—$CO_2$ flow rate. The flow rate will typically be selected in a manner to minimize the residence time of the bean material in the extractor at elevated temperatures without sacrificing the overall quality of the product. It is noted that under some conditions, it may take slightly longer for the raw grassy and bitter principles to be reduced to a desired level than for the oil to be removed. Upon preselection of an operable combination of pressure, temperature, and moisture content, determination of the proper balance of flow rate and time would be within the skill of the person in the art. Flow rates of 40-100 standard per minute per kilogram of material are usually adequate.

For achieving the desired results, the minimum practical pressure in terms of oil solubility and duration of extraction, is about 690 bar (10,000 p.s.i.). The upper limit of pressure is constrained only by the equipment and economics. The operable temperature range extends from about 81° C. Below 81°, the overall flavor quality drastically declines and above 100° C., the susceptibility of the protein to denaturization results in low NSI values. Throughout the preferred pressure range of 755-860 bar (11,000-12,500 p.s.i.), the moisture content and the temperature must be varied in a generally inverse relationship with one another. That is, the moisture and temperature cannot both be at the same extremity of their respective ranges. When both are at the low end, the product flavor is inferior, and when both are at the high end, the NSI is inordinately diminished.

We have found that during the course of SC—$CO_2$ treatment, first the lipids are extracted and then the water. In a batch operation, the material at the fluid input end of the extractor is of course the first to be stripped of its oil. The front of highest rate of extraction then progresses through the material toward the extractor outlet. As a result, the moisture content of the material at the input end sometimes tends to prematurely fall below an acceptable level for purposes of eliminating the grassy and bitter off-flavors. When this phenomenon is encountered, it is desirable to humidify the incoming solvent. For systems equipped with a filter upstream of the inlet, an effective method of humidification is to saturate the filter with water prior to commencing the process. Other suitable techniques of humidifying the incoming $CO_2$ would be readily apparent to the skilled artisan.

The solubility of the oil in the $CO_2$ is a function of the temperature and presure, and under fixed conditions it remains virtually constant throughout most of the extraction. However, as the residual oil in the soybean material approaches zero, so does the apparent solubility.

Oil-laden SC—$CO_2$ is passed from the extractor to the separator for subsequent recovery. The defatted residue (soybean flakes) recovered from the extractor is dry and very friable and for all practical purposes is reduced to a meal. It is readily milled to a fine, highly dispersible flour having utility in beverages, doughs, baked products, and batter foods. The flour will generally contain 49-50% by weight protein characterized by an NSI of at least 60 and a lipoxygenase activity near zero.

Alternatively, the defatted flakes are suitable for conversion into high-quality protein concentrates by any of the several methods as known in the art. In concentrate preparation, the protein is immobilized and the sugars and other soluble components are removed. Three conventional methods of producing soybean concentrates including acid precipitation, ethanol treatment, and heat treatment are discussed in "Soybeans: Chemistry and Technology, Vol. I. Proteins, " A. K. Smith and S. J. Circle (eds.), Avi, Westport, CT (1972), pp 318-319. Also, the defatted soybean residue of this invention is convertible to a superior quality protein isolate by any of the conventionally known methods in the art.

The following examples are intended only to further illustrate the invention and are not intended to limit the scope of the invention which is defined by the claims.

EXAMPLES 1-15

Clean certified seed boybeans were cracked, dehulled, and flaked to 0.25 mm. by passing through a smooth roller mill. The flakes were then tempered to the desired moisture levels by addition or removal of the appropriate amount of water. For each run, 35 g. of these flakes were placed in an extractor tube, 560-mm. long × 14.4-mm. i.d. (pressure rating 1380 bar). A glass wool filter plug was placed in each end of the tube. One milliliter of water was added to the filter plug on the inlet side (top) of the extractor. Dry commercial grade $CO_2$, at the desired pressure, was passed through the flakes at the rate of 6 standard liters per min. (171 SL./min./kg.) for 20 min. whilemaintaining the desired temperature to within ±½°C. The flow rate and treatment time were preselected to insure essentially completeextraction for all runs. Extracted oil was recovered from the $CO_2$ in a separator maintained at 60° C. Oil yields ranged from 22.56% to 22.91% dry weight basis of the starting flakes for all 15 runs with residual oil of <1% in the extracted meal. The defatted soy flakes were removed from the extraction tube and ground to 100 mesh for subsequent evaluation and analysis. NSI was determined by the AOCS Official Method Ba 11-65.

A 15-member trained panel experienced in testing soybean protein products evaluated the samples for flavor by the method of Warner et al. Cereal Chem. 60(2): 102-106 (1983), herein incorporated by reference. The products were tested as 2% dispersions in carbon-filtered tap water at room temperature. The individual flavors of the samples were rated on a 0-3 scale (0=no flavor, 1=weak, 2=moderate, and 3=strong intensity). Flavor-intensity values (FIV), which are weighted averages, were calculated by the following formula:

$$FIV = \frac{1 \times \text{No. weak responses} + 2 \times \text{No. moderate responses} + 3 \times \text{No. strong responses}}{\text{No. of testers}}$$

Overall scores were based on a 10-point scale, with 10 as bland (excellent quality) and 1 as strong (poor quality). Raw scores were adjusted to account for variation among subjects. Balanced incomplete block designs were used as testing patterns for the 15 runs (Cochran and Cox, Experimental Designs, 2nd Edition, John Wiley & Sons, Inc., New York, NY, 1957). The testers evaluated three samples at each panel sitting; each sample received a total of nine scores that were used to calculate an overall mean score.

the results are reported in Table I, below.

TABLE I

| Example | Pressure, bar | Temperature, °C. | Moisture content, % | NSI[a] | Adjusted flavor score[a] | FIV's[a] Raw grassy | FIV's[a] Bitter | Lipoxygenase activity, % of initial |
|---|---|---|---|---|---|---|---|---|
| 1 | 731 | 90 | 9.0 | 66.2 | 6.3 | 1.1 | 0.7 | 0 |
| 2 | 758 | 84[b] | 6.5[b] | 79.7 | 4.2 | 2.4 | 0.9 | 20 |
| 3 | 758 | 84 | 11.4 | 63.3 | 6.1 | 1.2 | 0.9 | 0 |
| 4 | 758 | 96 | 6.5 | 66.8 | 6.8 | 0.9 | 0.7 | 0 |
| 5 | 758 | 96[b] | 11.4[b] | 32.5 | 7.2 | 0.6 | 0.6 | 0 |
| 6 | 793 | 80[c] | 9.0 | 80.2 | 5.8 | 1.0 | 0.9 | 17 |
| 7 | 793 | 90 | 5.0[c] | 82.0 | 4.8 | 2.2 | 1.3 | 9 |
| 8 | 793 | 90 | 9.0 | 67.5 | 6.6 | 0.9 | 0.8 | 0 |
| 9 | 793 | 90 | 12.4 | 61.6 | 6.4 | 0.8 | 0.9 | 0 |
| 10 | 793 | 100[b] | 9.0[b] | 48.0 | 6.9 | 0.6 | 0.2 | 0 |
| 11 | 827 | 84[b] | 6.5[b] | 80.7 | 5.6 | 1.4 | 0.8 | 14 |
| 12 | 827 | 84 | 11.4 | 62.4 | 7.2 | 0.4 | 0.6 | 0 |
| 13 | 827 | 96 | 6.5 | 72.0 | 6.0 | 1.0 | 1.1 | 0 |
| 14 | 827 | 96[b] | 11.4[b] | 34.3 | 7.3 | 0.3 | 0.4 | 0 |
| 15 | 855 | 90 | 9.0 | 69.4 | 6.6 | 0.8 | 0.4 | 0 |

[a]Acceptable values: NSI (nitrogen solubility index) ≧60 Adjusted flavor score ≧6.0 FIV (flavor-intensity value) ≦1.5
[b]Parameter combination unacceptable.
[c]Inidividual parameter unacceptable.

EXAMPLE 16

A sample of certified seed grade soybeans was cracked, dehulled, and the grits passed through a smooth roller mill to produce 0.025–040 mm. thick flakes which contained 19.9% oil, 41.2% protein, and 11.2% moisture. A 1500-g. sample was loaded into a 4-L. extractor, which was thereafter sealed and brought to 862 bar (12,500 p.s.i.g.) pressure while it was being heated to a controlled 82°–83° C. With a $CO_2$ cylinder pressure of 76–83 bar (1100–1200 p.s.i.g.), a flow of 67 SL./min./kg. was maintained for 20 min. The separator (receiver) was heated to 60° C. to remove extracted water from the recovered oil. Measurement of $CO_2$ consumed and oil recovered at periodic intervals permitted calculation of oil recovery rates and oil solubility. These values remained constant until the residual oil was reduced to a few percent of the initial level. The defatted meal was removed from the extractor and milled to yield a flour of about 100 mesh. The recovered flour contained 0.82% residual oil and 8.1% moisture. The flour was further characterized by an NSI of 63.1 and an overall flavor score of 7.3 when evaluated by a trained taste panel.

EXAMPLE 17

To illustrate the functional and sensory properties of SC—$CO_2$ extracted soybean flour, 400 g. of the flour prepared by the method of Example 16 were mechanically stirred in 4 L. of water at room temperature, and the suspension was repeatedly adjusted to pH 7.4–7.6 with alkali during the 1 hr. of stirring. The suspension was then centrifuged, and the separated solids were stirred in another 2000 ml. of water for 30 min. before centrifuging. The two centrifugation supernatants were combined, and HCl added to lower the pH to 4.2–4.7. The precipitated protein was isolated by centrifugation, and the moist curd collected. The curd was dispersed in 400 ml. of distilled water, and the protein suspension was adjusted to pH 7.1 by the addition of alkali. The proteinate was freeze-dried to yield the sodium proteinate product of 105.2 g. which is a 26.3% yield based on the starting SC—$CO_2$ extracted flakes. The prepared isolate was presented to a trained taste panel for evaluation as described in Examples 1–15. The reported overall flavor was 6.1 with no significant raw grassy intensity.

EXAMPLE 18

A soybean protein concentrate was prepared by suspending 100 g. of soybean flakes extracted by the process of Example 16 in 3 L. of water. The pH was adjusted to 4.5 while the sample was stirred for 1.5 hr. The insolubles were separated by centrifugation, resuspended in water, and thereafter freeze-dried. The product was characterized by an overall flavor score of 6.1 when evaluated by a trained taste panel.

EXAMPLE 19

A second soybean protein concentrate was prepared by suspending 100 g. of soybean flakes extracted by the process of Example 16 in 3 L. of 60% aqueous ethyl alcohol. After stirring 1.5 hr., the suspension was centrifuged, and the residue dispersed in water, and freeze-dried. The product was characterized by an overall flavor score of 7.2 when evaluated by a trained taste panel.

EXAMPLE 20

A third soybean protein concentrate was prepared by toasting 100 g. of soybean flakes extracted by the process of Example 16 in an autoclave at 121° C. and 1 bar gauge for 15 min. After toasting, the sample was washed with 3 L. of water and centrifuged. The recovered solids were suspended in water and the concentrate collected by freeze drying. The product was characterized by an overall flavor score of 6.8 when evaluated by a trained taste panel.

It is understood that the foregoing detailed description is given merely by way of illustration and that modification and variations may be made therein without departing from the spirit and scope of the invention.

We claim:

1. A method for preparing a flavorful, defatted soybean protein product from raw soybean material comprising the steps of:

a. contacting said soybean material at a moisture content above 6.5% dry weight basis with a carbon dioxide solvent under supercritical conditions such that the characteristic raw grassy flavor is reduced without a substantial reduction in the protein solubility, wherein said conditions include a pressure of at least 690 bar and a temperature of at least 81° C., and thereby extracting the lipids from said soybean material;

b. separating the lipid-containing carbon dioxide solvent resulting from step (a) from a substantially lipid-free soybean residue; and c. recovering said residue as a nutritious, organoleptically acceptable product characterized by a substantially reduced raw grassy flavor as compared to that of the raw soybean material.

2. The method as described in claim 1 wherein said soybean material is in flaked form.

3. The method as described in claim 1 and further comprising milling said recovered residue into a flour.

4. The method as described in claim 1 wherein said moisture content is in the range of 9–12%.

5. The method as described in claim 4 wherein the pressure is in the range of 793–855 bar.

6. The method as described in claim 4 wherein the temperature is in the range of 81°–100° C.

7. The method as described in claim 1 wherein the moisture content is in the range of about 10–12%, the pressure is in the range of about 827–855 bar, and the temperature is in the range of about 81°–84° C.

8. A method as described in claim 1 wherein the moisture content is not more than about 15%, the pressure is in the range of about 755–860 bar, and the temperature is in the range of about 81°–100° C.

9. A product produced by the process of claim 1 wherein said product is characterized by a nitrogen solubility index of at least 60 and a lipoxygenase activity near zero.

10. A product produced by the process of claim 3 wherein said product is characterized by a nitrogen solubility index of at least 60 and a lipoxygenase activity near zero.

11. A product produced by the process of claim 7 wherein said product is characterized by a nitrogen solubility index of at least 60 and a lipoxygenase activity near zero.

12. A product produced by the process of claim 8 wherein said product is characterized by a nitrogen solubility index of at least 60 and a lipoxygenase activity near zero.

* * * * *